(12) United States Patent
Keremane et al.

(10) Patent No.: US 11,232,004 B2
(45) Date of Patent: *Jan. 25, 2022

(54) IMPLEMENTING AUTOMATIC SWITCHOVER

(71) Applicant: NetApp Inc., Sunnyvale, CA (US)

(72) Inventors: Hrishikesh Keremane, Sunnyvale, CA (US); Vijay Singh, San Jose, CA (US)

(73) Assignee: NetApp, Inc., San Jose, CA (US)

( * ) Notice: Subject to any disclaimer, the term of this patent is extended or adjusted under 35 U.S.C. 154(b) by 125 days.

This patent is subject to a terminal disclaimer.

(21) Appl. No.: 16/681,979

(22) Filed: Nov. 13, 2019

(65) Prior Publication Data

US 2020/0081807 A1   Mar. 12, 2020

Related U.S. Application Data

(63) Continuation of application No. 15/820,851, filed on Nov. 22, 2017, now Pat. No. 10,503,619, which is a
(Continued)

(51) Int. Cl.
*G06F 11/00* (2006.01)
*G06F 11/20* (2006.01)
*G06F 11/07* (2006.01)

(52) U.S. Cl.
CPC ...... *G06F 11/2069* (2013.01); *G06F 11/0727* (2013.01); *G06F 11/0757* (2013.01); *G06F 11/2092* (2013.01); *G06F 2201/805* (2013.01)

(58) Field of Classification Search
CPC ............. G06F 11/0727; G06F 11/0757; G06F 11/2069; G06F 11/2071; G06F 11/2092;
(Continued)

(56) References Cited

U.S. PATENT DOCUMENTS 5,696,895 A    12/1997  Hemphill et al.
6,119,244 A *  9/2000   Schoenthal ........... G06F 11/142
                                                    709/216
(Continued)

OTHER PUBLICATIONS

International search report and Written Opinion for Application No. PCT/US2016/058374 dated Jan. 23, 2017, 21 pages.

*Primary Examiner* — Marc Duncan
(74) *Attorney, Agent, or Firm* — Cooper Legal Group, LLC

(57) ABSTRACT

One or more techniques and/or computing devices are provided for automatic switchover implementation. For example, a first storage controller, of a first storage cluster, may have a disaster recovery relationship with a second storage controller of a second storage cluster. In the event the first storage controller fails, the second storage controller may automatically switchover operation from the first storage controller to the second storage controller for providing clients with failover access to data previously accessible to the clients through the first storage controller. The second storage controller may detect, cross-cluster, a failure of the first storage controller utilizing remote direct memory access (RDMA) read operations to access heartbeat information, heartbeat information stored within a disk mailbox, and/or service processor traps. In this way, the second storage controller may efficiently detect failure of the first storage controller to trigger automatic switchover for non-disruptive client access to data.

20 Claims, 10 Drawing Sheets

Related U.S. Application Data continuation of application No. 14/920,334, filed on Oct. 22, 2015, now Pat. No. 9,836,368.

(58) Field of Classification Search
CPC ............. G06F 11/2023; G06F 11/2028; G06F 11/203; G06F 11/2033
See application file for complete search history.

(56) References Cited

U.S. PATENT DOCUMENTS

| | | | |
|---|---|---|---|
| 7,076,687 B2 | 7/2006 | Fujibayashi et al. | |
| 7,171,452 B1 | 1/2007 | Gole | |
| 7,293,195 B1 | 11/2007 | Watanabe et al. | |
| 7,787,383 B2 * | 8/2010 | Bali .................... | H04L 43/0811 370/241 |
| 8,028,054 B1 | 9/2011 | Watanabe et al. | |
| 8,060,776 B1 | 11/2011 | Schoenthal et al. | |
| 8,630,985 B2 * | 1/2014 | Luo .................... | G06F 11/2041 707/674 |
| 9,836,368 B2 * | 12/2017 | Keremane ........... | G06F 11/0727 |
| 10,503,619 B2 * | 12/2019 | Keremane ........... | G06F 11/0757 |
| 2007/0294563 A1 | 12/2007 | Bose | |
| 2008/0162984 A1 | 7/2008 | Kalra et al. | |
| 2014/0258608 A1 | 9/2014 | Viswanatha | |

* cited by examiner

IMPLEMENTING AUTOMATIC SWITCHOVER

RELATED APPLICATIONS

This application claims priority to and is a continuation of U.S. application Ser. No. 15/820,851, filed on Nov. 22, 2017, now allowed, and titled "IMPLEMENTING AUTOMATIC SWITCHOVER," which claims priority to and is a continuation of U.S. Pat. No. 9,836,368, filed on Oct. 22, 2015 and titled "IMPLEMENTING AUTOMATIC SWITCHOVER," which are incorporated herein by reference.

BACKGROUND

Many storage networks may implement data replication and/or other redundancy data access techniques for data loss protection and non-disruptive client access. For example, a first storage cluster may comprise a first storage controller configured to provide clients with primary access to data stored within a first storage device and/or other storage devices. A second storage cluster may comprise a second storage controller configured to provide clients with access to data stored within a second storage device (e.g., failover access to replicated data within the second storage device) and/or other storage devices (e.g., primary access to data stored within a third storage device). The first storage controller and the second storage controller may be configured according to a disaster recovery relationship, such that the second storage controller may provide failover access to replicated data that was replicated from the first storage device to the second storage device (e.g., a switchover operation may be performed where the second storage controller assumes ownership of the second storage device and/or other storage devices previously owned by the first storage controller so that the second storage controller may provide clients with failover access to data within such storage devices).

In an example, the second storage cluster may be located at a remote site to the first storage cluster (e.g., storage clusters may be located in different buildings, cities, thousands of kilometers from one another, etc.). Thus, if a disaster occurs at a site of a storage cluster, then a surviving storage cluster may remain unaffected by the disaster (e.g., a power outage of a building hosting the first storage cluster may not affect a second building hosting the second storage cluster in a different city).

If the first storage cluster merely comprises the first storage controller and the second storage cluster merely comprises the second storage controller (e.g., single storage controller cluster configurations that may be cost effective due to clusters merely comprising single storage controllers), then there may not be local high availability storage controllers paired with the first storage controller or the second storage controller that could otherwise provide relatively fast local takeover for a failed storage controller for non-disruptive client access to data of the failed storage controller (e.g., if the first storage cluster comprised a third storage controller having a high availability pairing with the first storage controller, then the third storage controller could quickly takeover for the first storage controller in the event the first storage controller fails). Instead, a cross cluster switchover operation may need to be performed if a storage controller fails. Cross-cluster remote detection of a storage controller failure (e.g., the second storage controller, within the second storage cluster, detecting a failure of the first storage controller within the first storage cluster) may utilize timeouts, manual switchover, and/or other relatively slow or imprecise techniques that may not provide adequate non-disruptive client access to data (e.g., a client may lose access to data for more than 2 minutes while waiting on a manual switchover from a failed storage controller to a surviving storage controller). Thus, it may be advantageous to quickly and reliably detect storage controller failure cross-cluster for automatic implementation of switchover operations.

DETAILED DESCRIPTION

Figure 1:
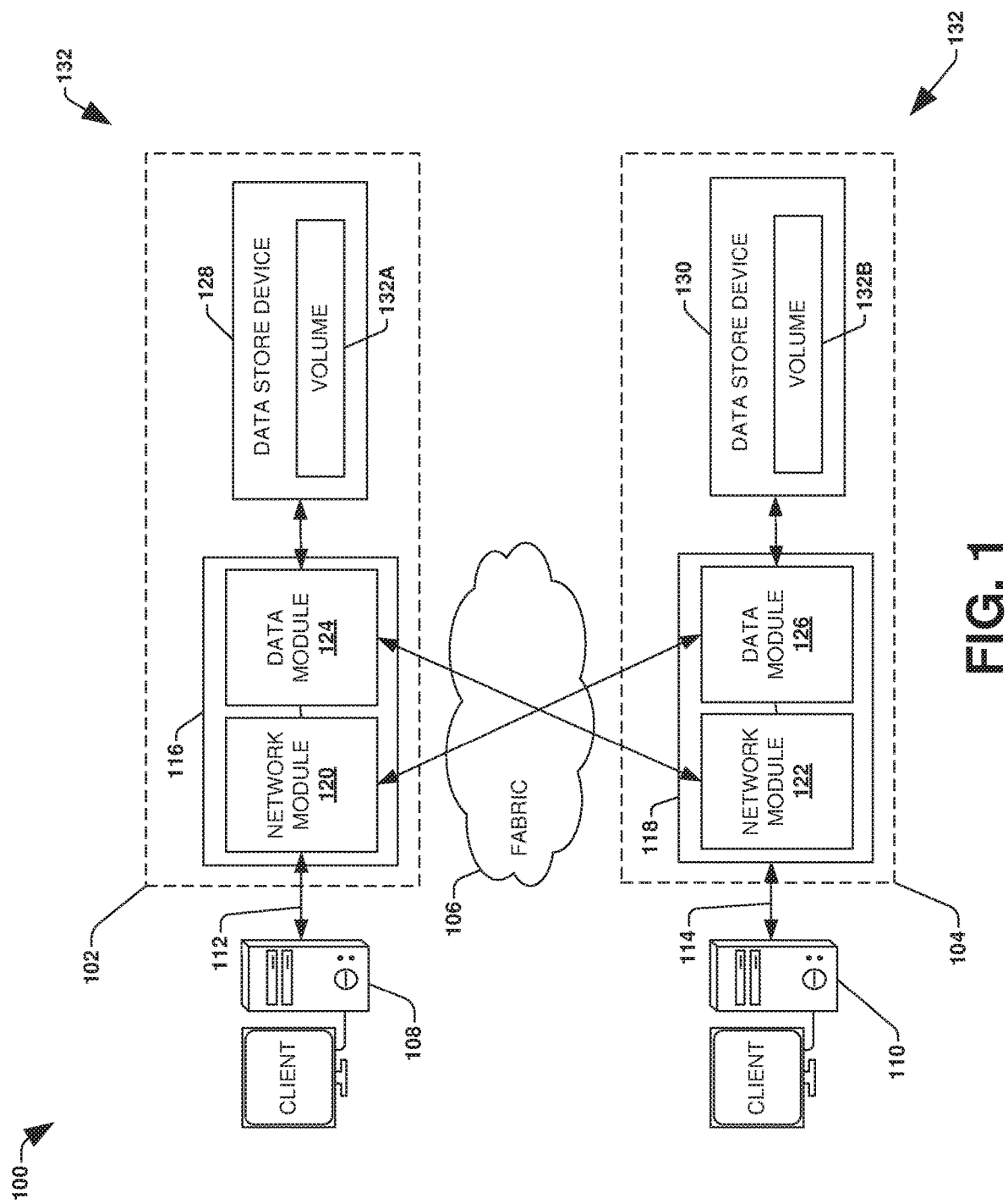
FIG. 1 is a component block diagram illustrating an example clustered network in accordance with one or more of the provisions set forth herein.

Some examples of the claimed subject matter are now described with reference to the drawings, where like reference numerals are generally used to refer to like elements throughout. In the following description, for purposes of explanation, numerous specific details are set forth in order to provide an understanding of the claimed subject matter. It may be evident, however, that the claimed subject matter may be practiced without these specific details. Nothing in this detailed description is admitted as prior art.

One or more techniques and/or computing devices for automatic switchover implementation are provided. For example, a first storage controller, within a first storage cluster, may have a disaster recovery relationship with a second storage controller, within a second storage cluster, such that a surviving storage controller may provide clients with failover access to data in the event the other storage controller fails. As provided herein, failure of a storage controller may be quickly identified cross-cluster based upon a heartbeat signal that is identified by a surviving storage controller using a remote direct memory access (RDMA) read operation, a read operation from a disk mailbox of the failed storage controller, or receipt of a service processor trap sent by a service processor of the failed storage controller. Responsive to identifying failure of the failed storage controller, the surviving storage controller may automatically implement a switchover operation where the surviving storage controller takes over ownership of storage from the failed storage controller so that the surviving storage controller may provide clients with failover access to data within such storage.

To provide context for automatic switchover implementation, FIG. 1 illustrates an embodiment of a clustered network environment 100 or a network storage environment. It may be appreciated, however, that the techniques, etc. described herein may be implemented within the clustered network environment 100, a non-cluster network environment, and/or a variety of other computing environments, such as a desktop computing environment. That is, the instant disclosure, including the scope of the appended claims, is not meant to be limited to the examples provided herein. It will be appreciated that where the same or similar components, elements, features, items, modules, etc. are illustrated in later figures but were previously discussed with regard to prior figures, that a similar (e.g., redundant) discussion of the same may be omitted when describing the subsequent figures (e.g., for purposes of simplicity and ease of understanding).

FIG. 1 is a block diagram illustrating an example clustered network environment 100 that may implement at least some embodiments of the techniques and/or systems described herein. The example environment 100 comprises data storage systems or storage sites 102 and 104 that are coupled over a cluster fabric 106, such as a computing network embodied as a private Infiniband, Fibre Channel (FC), or Ethernet network facilitating communication between the storage systems 102 and 104 (and one or more modules, component, etc. therein, such as, nodes 116 and 118, for example). It will be appreciated that while two data storage systems 102 and 104 and two nodes 116 and 118 are illustrated in FIG. 1, that any suitable number of such components is contemplated. In an example, nodes 116, 118 comprise storage controllers (e.g., node 116 may comprise a primary or local storage controller and node 118 may comprise a secondary or remote storage controller) that provide client devices, such as host devices 108, 110, with access to data stored within data storage devices 128, 130. Similarly, unless specifically provided otherwise herein, the same is true for other modules, elements, features, items, etc. referenced herein and/or illustrated in the accompanying drawings. That is, a particular number of components, modules, elements, features, items, etc. disclosed herein is not meant to be interpreted in a limiting manner.

It will be further appreciated that clustered networks are not limited to any particular geographic areas and can be clustered locally and/or remotely. Thus, in one embodiment a clustered network can be distributed over a plurality of storage systems and/or nodes located in a plurality of geographic locations; while in another embodiment a clustered network can include data storage systems (e.g., 102, 104) residing in a same geographic location (e.g., in a single onsite rack of data storage devices).

In the illustrated example, one or more host devices 108, 110 which may comprise, for example, client devices, personal computers (PCs), computing devices used for storage (e.g., storage servers), and other computers or peripheral devices (e.g., printers), are coupled to the respective data storage systems 102, 104 by storage network connections 112, 114. Network connection may comprise a local area network (LAN) or wide area network (WAN), for example, that utilizes Network Attached Storage (NAS) protocols, such as a Common Internet File System (CIFS) protocol or a Network File System (NFS) protocol to exchange data packets. Illustratively, the host devices 108, 110 may be general-purpose computers running applications, and may interact with the data storage systems 102, 104 using a client/server model for exchange of information. That is, the host device may request data from the data storage system (e.g., data on a storage device managed by a network storage control configured to process I/O commands issued by the host device for the storage device), and the data storage system may return results of the request to the host device via one or more network connections 112, 114.

The nodes 116, 118 on clustered data storage systems 102, 104 can comprise network or host nodes that are interconnected as a cluster to provide data storage and management services, such as to an enterprise having remote locations, cloud storage (e.g., a storage endpoint may be stored within a data cloud), etc., for example. Such a node in a data storage and management network cluster environment 100 can be a device attached to the network as a connection point, redistribution point or communication endpoint, for example. A node may be capable of sending, receiving, and/or forwarding information over a network communications channel, and could comprise any device that meets any or all of these criteria. One example of a node may be a data storage and management server attached to a network, where the server can comprise a general purpose computer or a computing device particularly configured to operate as a server in a data storage and management system.

In an example, a first storage cluster of nodes such as the nodes 116, 118 (e.g., a first set of storage controllers configured to provide access to a first storage aggregate comprising a first logical grouping of one or more storage devices) may be located on a first storage site. A second storage cluster of nodes, not illustrated, may be located at a second storage site (e.g., a second set of storage controllers configured to provide access to a second storage aggregate comprising a second logical grouping of one or more storage devices). The first storage cluster of nodes and the second storage cluster of nodes may be configured according to a disaster recovery configuration where a surviving cluster of nodes provides switchover access to storage devices of a disaster cluster of nodes in the event a disaster occurs at a disaster storage site comprising the disaster cluster of nodes (e.g., the first storage cluster of nodes provides client devices with switchover data access to storage devices of the second storage aggregate in the event a disaster occurs at the second storage site).

As illustrated in the exemplary environment 100, nodes 116, 118 can comprise various functional components that coordinate to provide distributed storage architecture for the cluster. For example, the nodes can comprise a network module 120, 122 and a data module 124, 126. Network modules 120, 122 can be configured to allow the nodes 116, 118 (e.g., network storage controllers) to connect with host devices 108, 110 over the network connections 112, 114, for example, allowing the host devices 108, 110 to access data stored in the distributed storage system. Further, the network modules 120, 122 can provide connections with one or more other components through the cluster fabric 106. For example, in FIG. 1, a first network module 120 of first node 116 can access a second data storage device 130 by sending a request through a second data module 126 of a second node 118.

Data modules 124, 126 can be configured to connect one or more data storage devices 128, 130, such as disks or arrays of disks, flash memory, or some other form of data storage, to the nodes 116, 118. The nodes 116, 118 can be interconnected by the cluster fabric 106, for example, allowing respective nodes in the cluster to access data on data storage devices 128, 130 connected to different nodes in the cluster. Often, data modules 124, 126 communicate with the data storage devices 128, 130 according to a storage area network (SAN) protocol, such as Small Computer System Interface (SCSI) or Fiber Channel Protocol (FCP), for example. Thus, as seen from an operating system on a node 116, 118, the data storage devices 128, 130 can appear as locally attached to the operating system. In this manner, different nodes 116, 118, etc. may access data blocks through the operating system, rather than expressly requesting abstract files.

It should be appreciated that, while the example embodiment 100 illustrates an equal number of network and data modules, other embodiments may comprise a differing number of these modules. For example, there may be a plurality of network and data modules interconnected in a cluster that does not have a one-to-one correspondence between the network and data modules. That is, different nodes can have a different number of network and data modules, and the same node can have a different number of network modules than data modules.

Further, a host device 108, 110 can be networked with the nodes 116, 118 in the cluster, over the networking connections 112, 114. As an example, respective host devices 108, 110 that are networked to a cluster may request services (e.g., exchanging of information in the form of data packets) of a node 116, 118 in the cluster, and the node 116, 118 can return results of the requested services to the host devices 108, 110. In one embodiment, the host devices 108, 110 can exchange information with the network modules 120, 122 residing in the nodes (e.g., network hosts) 116, 118 in the data storage systems 102, 104.

In one embodiment, the data storage devices 128, 130 comprise volumes 132, which is an implementation of storage of information onto disk drives or disk arrays or other storage (e.g., flash) as a file-system for data, for example. Volumes can span a portion of a disk, a collection of disks, or portions of disks, for example, and typically define an overall logical arrangement of file storage on disk space in the storage system. In one embodiment a volume can comprise stored data as one or more files that reside in a hierarchical directory structure within the volume.

Volumes are typically configured in formats that may be associated with particular storage systems, and respective volume formats typically comprise features that provide functionality to the volumes, such as providing an ability for volumes to form clusters. For example, where a first storage system may utilize a first format for their volumes, a second storage system may utilize a second format for their volumes.

In the example environment 100, the host devices 108, 110 can utilize the data storage systems 102, 104 to store and retrieve data from the volumes 132. In this embodiment, for example, the host device 108 can send data packets to the network module 120 in the node 116 within data storage system 102. The node 116 can forward the data to the data storage device 128 using the data module 124, where the data storage device 128 comprises volume 132A. In this way, in this example, the host device can access the storage volume 132A, to store and/or retrieve data, using the data storage system 102 connected by the network connection 112. Further, in this embodiment, the host device 110 can exchange data with the network module 122 in the host 118 within the data storage system 104 (e.g., which may be remote from the data storage system 102). The host 118 can forward the data to the data storage device 130 using the data module 126, thereby accessing volume 132B associated with the data storage device 130.

It may be appreciated that automatic switchover implementation may be implemented within the clustered network environment 100. In an example, the node 116 (e.g., a first storage controller) may cross-cluster (e.g., across the cluster fabric 106 or another network) detect a failure of the node 118 (e.g., a second storage controller) utilizing heartbeat information obtained through remote direct memory access (RDMA) read operations, read operations from a disk mailbox of the node 118, and/or service processor traps sent by a service processor of the node 118. In this way, the node 116 may automatically implement a switchover operation. It may be appreciated that automatic switchover implementation may be implemented for and/or between any type of computing environment, and may be transferable between physical devices (e.g., node 116, node 118, etc.) and/or a cloud computing environment (e.g., remote to the clustered network environment 100).

Figure 2:
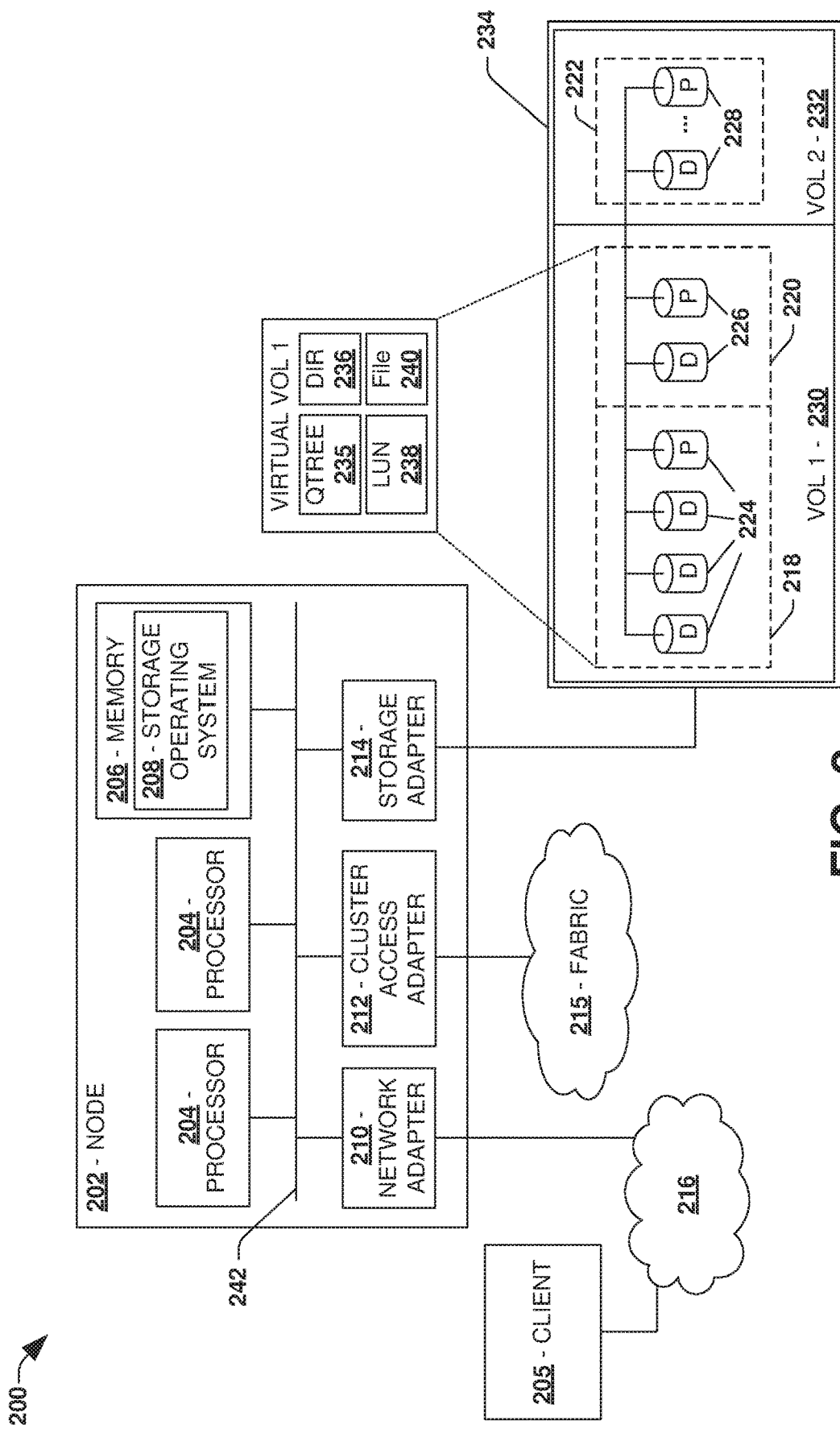
FIG. 2 is a component block diagram illustrating an example data storage system in accordance with one or more of the provisions set forth herein.

FIG. 2 is an illustrative example of a data storage system 200 (e.g., 102, 104 in FIG. 1), providing further detail of an embodiment of components that may implement one or more of the techniques and/or systems described herein. The example data storage system 200 comprises a node 202 (e.g., host nodes 116, 118 in FIG. 1), and a data storage device 234 (e.g., data storage devices 128, 130 in FIG. 1). The node 202 may be a general purpose computer, for example, or some other computing device particularly configured to operate as a storage server. A host device 205 (e.g., 108, 110 in FIG. 1) can be connected to the node 202 over a network 216, for example, to provides access to files and/or other data stored on the data storage device 234. In an example, the node 202 comprises a storage controller that provides client devices, such as the host device 205, with access to data stored within data storage device 234.

The data storage device 234 can comprise mass storage devices, such as disks 224, 226, 228 of a disk array 218, 220, 222. It will be appreciated that the techniques and systems, described herein, are not limited by the example embodiment. For example, disks 224, 226, 228 may comprise any type of mass storage devices, including but not limited to magnetic disk drives, flash memory, and any other similar media adapted to store information, including, for example, data (D) and/or parity (P) information.

The node 202 comprises one or more processors 204, a memory 206, a network adapter 210, a cluster access adapter 212, and a storage adapter 214 interconnected by a system bus 242. The storage system 200 also includes an operating system 208 installed in the memory 206 of the node 202 that can, for example, implement a Redundant Array of Independent (or Inexpensive) Disks (RAID) optimization technique to optimize a reconstruction process of data of a failed disk in an array.

The operating system 208 can also manage communications for the data storage system, and communications between other data storage systems that may be in a clustered network, such as attached to a cluster fabric 215 (e.g., 106 in FIG. 1). Thus, the node 202, such as a network storage controller, can respond to host device requests to manage data on the data storage device 234 (e.g., or additional clustered devices) in accordance with these host device requests. The operating system 208 can often establish one or more file systems on the data storage system 200, where a file system can include software code and data structures that implement a persistent hierarchical namespace of files and directories, for example. As an example, when a new data storage device (not shown) is added to a clustered network system, the operating system 208 is informed where, in an existing directory tree, new files associated with the new data storage device are to be stored. This is often referred to as "mounting" a file system.

In the example data storage system 200, memory 206 can include storage locations that are addressable by the processors 204 and adapters 210, 212, 214 for storing related software application code and data structures. The processors 204 and adapters 210, 212, 214 may, for example, include processing elements and/or logic circuitry configured to execute the software code and manipulate the data structures. The operating system 208, portions of which are typically resident in the memory 206 and executed by the processing elements, functionally organizes the storage system by, among other things, invoking storage operations in support of a file service implemented by the storage system. It will be apparent to those skilled in the art that other processing and memory mechanisms, including various computer readable media, may be used for storing and/or executing application instructions pertaining to the techniques described herein. For example, the operating system can also utilize one or more control files (not shown) to aid in the provisioning of virtual machines.

The network adapter 210 includes the mechanical, electrical and signaling circuitry needed to connect the data storage system 200 to a host device 205 over a computer network 216, which may comprise, among other things, a point-to-point connection or a shared medium, such as a local area network. The host device 205 (e.g., 108, 110 of FIG. 1) may be a general-purpose computer configured to execute applications. As described above, the host device 205 may interact with the data storage system 200 in accordance with a client/host model of information delivery.

The storage adapter 214 cooperates with the operating system 208 executing on the node 202 to access information requested by the host device 205 (e.g., access data on a storage device managed by a network storage controller). The information may be stored on any type of attached array of writeable media such as magnetic disk drives, flash memory, and/or any other similar media adapted to store information. In the example data storage system 200, the information can be stored in data blocks on the disks 224, 226, 228. The storage adapter 214 can include input/output (I/O) interface circuitry that couples to the disks over an I/O interconnect arrangement, such as a storage area network (SAN) protocol (e.g., Small Computer System Interface (SCSI), iSCSI, hyperSCSI, Fiber Channel Protocol (FCP)). The information is retrieved by the storage adapter 214 and, if necessary, processed by the one or more processors 204 (or the storage adapter 214 itself) prior to being forwarded over the system bus 242 to the network adapter 210 (and/or the cluster access adapter 212 if sending to another node in the cluster) where the information is formatted into a data packet and returned to the host device 205 over the network connection 216 (and/or returned to another node attached to the cluster over the cluster fabric 215).

In one embodiment, storage of information on arrays 218, 220, 222 can be implemented as one or more storage "volumes" 230, 232 that are comprised of a cluster of disks 224, 226, 228 defining an overall logical arrangement of disk space. The disks 224, 226, 228 that comprise one or more volumes are typically organized as one or more groups of RAIDs. As an example, volume 230 comprises an aggregate of disk arrays 218 and 220, which comprise the cluster of disks 224 and 226.

In one embodiment, to facilitate access to disks 224, 226, 228, the operating system 208 may implement a file system (e.g., write anywhere file system) that logically organizes the information as a hierarchical structure of directories and files on the disks. In this embodiment, respective files may be implemented as a set of disk blocks configured to store information, whereas directories may be implemented as specially formatted files in which information about other files and directories are stored.

Whatever the underlying physical configuration within this data storage system 200, data can be stored as files within physical and/or virtual volumes, which can be associated with respective volume identifiers, such as file system identifiers (FSIDs), which can be 32-bits in length in one example.

A physical volume corresponds to at least a portion of physical storage devices whose address, addressable space, location, etc. doesn't change, such as at least some of one or more data storage devices 234 (e.g., a Redundant Array of Independent (or Inexpensive) Disks (RAID system)). Typically the location of the physical volume doesn't change in that the (range of) address(es) used to access it generally remains constant.

A virtual volume, in contrast, is stored over an aggregate of disparate portions of different physical storage devices. The virtual volume may be a collection of different available portions of different physical storage device locations, such as some available space from each of the disks 224, 226, and/or 228. It will be appreciated that since a virtual volume is not "tied" to any one particular storage device, a virtual volume can be said to include a layer of abstraction or virtualization, which allows it to be resized and/or flexible in some regards.

Further, a virtual volume can include one or more logical unit numbers (LUNs) 238, directories 236, Qtrees 235, and files 240. Among other things, these features, but more particularly LUNS, allow the disparate memory locations within which data is stored to be identified, for example, and grouped as data storage unit. As such, the LUNs 238 may be characterized as constituting a virtual disk or drive upon which data within the virtual volume is stored within the aggregate. For example, LUNs are often referred to as virtual drives, such that they emulate a hard drive from a general purpose computer, while they actually comprise data blocks stored in various parts of a volume.

In one embodiment, one or more data storage devices 234 can have one or more physical ports, wherein each physical port can be assigned a target address (e.g., SCSI target address). To represent respective volumes stored on a data storage device, a target address on the data storage device can be used to identify one or more LUNs 238. Thus, for example, when the node 202 connects to a volume 230, 232 through the storage adapter 214, a connection between the node 202 and the one or more LUNs 238 underlying the volume is created.

In one embodiment, respective target addresses can identify multiple LUNs, such that a target address can represent multiple volumes. The I/O interface, which can be implemented as circuitry and/or software in the storage adapter 214 or as executable code residing in memory 206 and executed by the processors 204, for example, can connect to volume 230 by using one or more addresses that identify the LUNs 238.

It may be appreciated that automatic switchover implementation may be implemented for the data storage system 200. In an example, the node 202 (e.g., a first storage controller) may cross-cluster (e.g., across the cluster fabric 215 or another network) detect a failure of a second node (e.g., a second storage controller) utilizing heartbeat information obtained through remote direct memory access (RDMA) read operations, read operations from a disk mailbox of the second node, and/or service processor traps sent by a service processor of the second node. It may be appreciated that automatic switchover implementation may be implemented for and/or between any type of computing environment, and may be transferable between physical devices (e.g., node 202, host 205, etc.) and/or a cloud computing environment (e.g., remote to the node 202 and/or the host 205).

Figure 3:
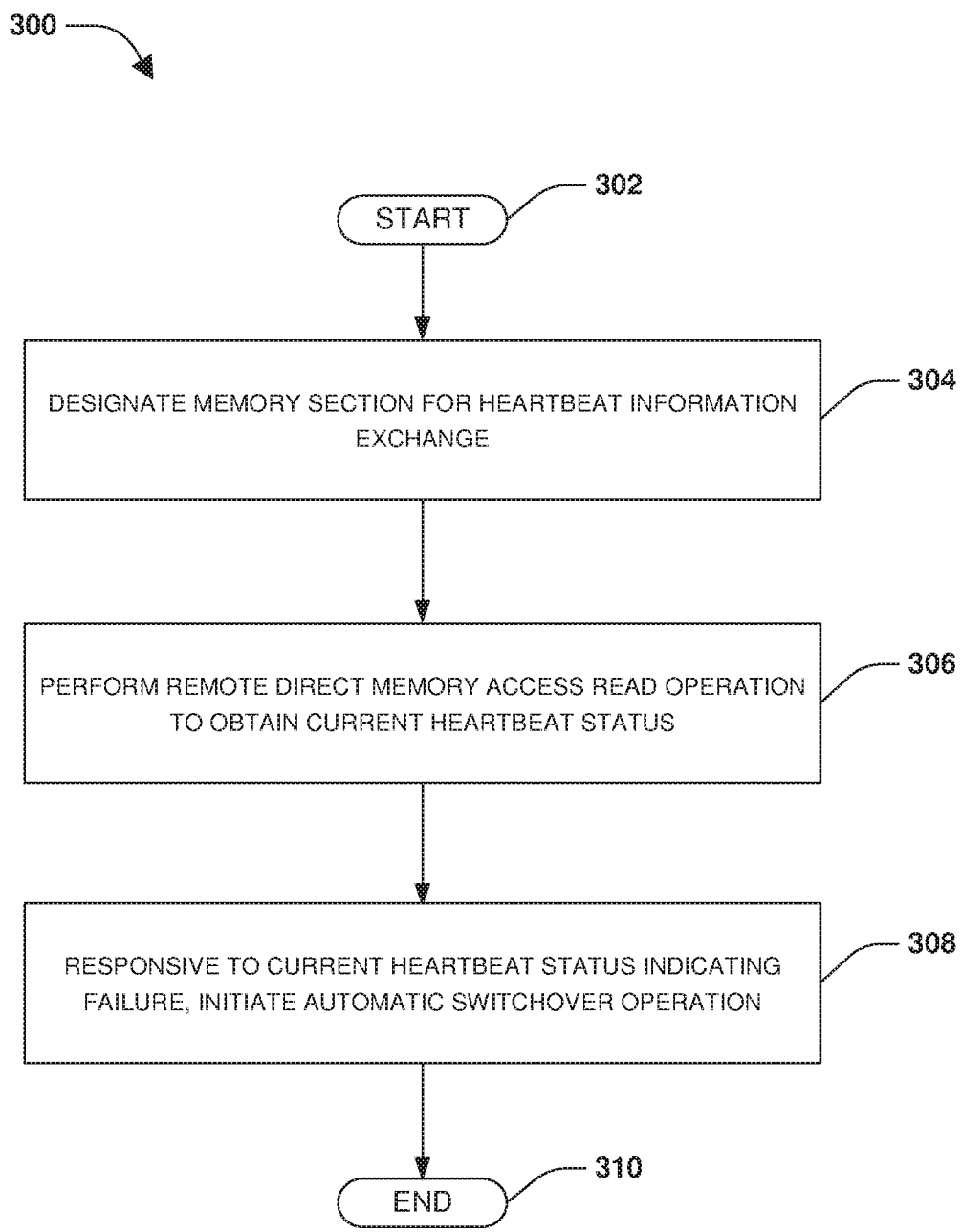
FIG. 3 is a flow chart illustrating an exemplary method of implementing automatic switchover.

One embodiment of automatic switchover implementation is illustrated by an exemplary method 300 of FIG. 3. A first storage cluster may comprise a first storage controller configured to provide clients with primary access to data stored within a first storage device and/or other storage devices. In an example, the first storage cluster has a single controller cluster configuration such that the first storage cluster merely comprises the first storage controller (e.g., but may lack a local high availability controller paired to the first storage controller for local failover). A second storage cluster may comprise a second storage controller configured as a disaster recovery partner for the first storage controller. For example, upon detecting a failure of the first storage controller (e.g., a disaster at the first storage cluster), the second storage controller may perform a switchover operation to obtain ownership of storage devices, owned by the first storage controller, so that the second storage controller may provide clients with failover access to such storage devices now owned by the second storage controller based upon the switchover operation. Upon recovery of the first storage controller, a switchback operation may be performed to return ownership of the storage devices back to the first storage controller so that the first storage controller can provide clients with primary access to such storage devices. In an example, the second storage cluster has the single controller cluster configuration such that the second storage cluster merely comprises the second storage controller (e.g., a lack of a local high availability controller partner).

As provided herein, a surviving storage controller may efficiently detect, cross-cluster, failure of a remote storage controller (e.g., the second storage controller detecting failure of the first storage controller) so that automatic switchover may be performed in a manner that satisfies client non-disruptive operation metrics (e.g., less than a 2 minute disruption of client access to data within the storage devices).

At 302, the method 300 starts. At 304, a memory section (e.g., a portion of memory associated with the first storage controller) may be designated for heartbeat information exchange from the first storage controller to the second storage controller. The heartbeat information exchange may be used by the first storage controller to convey operational health information of the first storage controller to the second storage controller. For example, the first storage controller may store a series of sequence numbers over time to indicate progress of the first storage controller (e.g., if the series of sequences numbers has not been updated within a threshold time, then the second storage controller may determine that the first storage controller may have had a failure, such as a software panic, a storage controller halt, a storage controller reboot, and/or other state transitions of the first storage controller from a normal operating state to a failure state). In this way, heartbeat status information may be conveyed to the second storage controller through the memory section.

At 306, the second storage controller may perform a remote direct memory access (RDMA) read operation to access the memory section for obtaining a current heartbeat status of the first storage controller. The current heartbeat status may comprise a new sequence number indicating progress of the first storage controller, a prior sequence number indicative of a lack of progress by the first storage controller, a normal operating state indication, a state transition indication, a software panic indication, a storage controller halt indication, a storage controller reboot indication, etc.

At 308, responsive to the current heartbeat status indicating a failure of the first storage controller, an automatic switchover operation may be performed. For example, the second storage controller may automatically trigger the switchover operation to obtain ownership of storage devices owned by the first storage controller. In this way, the second storage controller may provide clients with failover access to the storage devices so that clients are provided with non-disruptive access to data.

In an example, one or more checks may be performed before triggering the automatic switchover operation. For example, a communication signal may be sent from the second storage controller to the first storage cluster. Responsiveness to the communication signal may be evaluated to determine whether the failure is a false trigger (e.g., the first storage cluster may respond with an indication that the first storage controller is in an operational state). If the failure is a false trigger, then the automatic switchover may not be performed. If the failure is not a false trigger, then the automatic switchover operation may be performed and/or other checks may be performed. For example, responsive to determining that the failure is not the false trigger, a determination may be made as to whether storage and/or a main controller (e.g., a main box) of the first storage cluster are available. Responsive to the storage and/or the main controller not being available, a manual switchover operation may be performed instead of the automatic switchover operation. Responsive to the storage and/or the main controller being available, the automatic switchover operation may be performed and/or other checks may be performed. For example, a write caching synchronization state between the first storage controller and the second storage controller may be evaluated (e.g., the first storage controller may temporarily store write information relating to client I/O operations, such as write request, within a write request cache before flushing to disk, which may be mirrored to the second storage controller so that up-to-date cached client I/O operations, not yet flushed to disk, are accounted for by the second storage controller in the event of a switchover). The write caching synchronization state may be read from a first disk mailbox of the first storage controller (e.g., a raw read may be performed upon a storage device, owned by the first storage controller but not the second storage controller, hosting the first disk mailbox). Responsive to the write caching synchronization state indicating a synchronous state, the automatic switchover may be performed. Responsive to the write caching synchronization state indicating a non-synchronous state, the automatic switchover may not be performed.

In an example, heartbeat status information may also be obtained from the first disk mailbox corresponding to the storage device owned by the first storage controller, but not the second storage controller. Even though the second storage controller does not own the storage device hosting the first disk mailbox, the second storage controller may perform raw read operations to the first disk mailbox to obtain heartbeat status information. For example, second current heartbeat status information may be read from the first disk mailbox. Responsive to the current heartbeat status and/or the second current heartbeat status indicating the failure, the automatic switchover operation may be implemented (e.g., the second current heartbeat status may indicate a power loss failure of the first storage controller). For example, the automatic switchover operation may be initiated after a threshold timeout from the second current heartbeat status being indicative of the failure. At 310, the method 300 ends.

Figure 4:
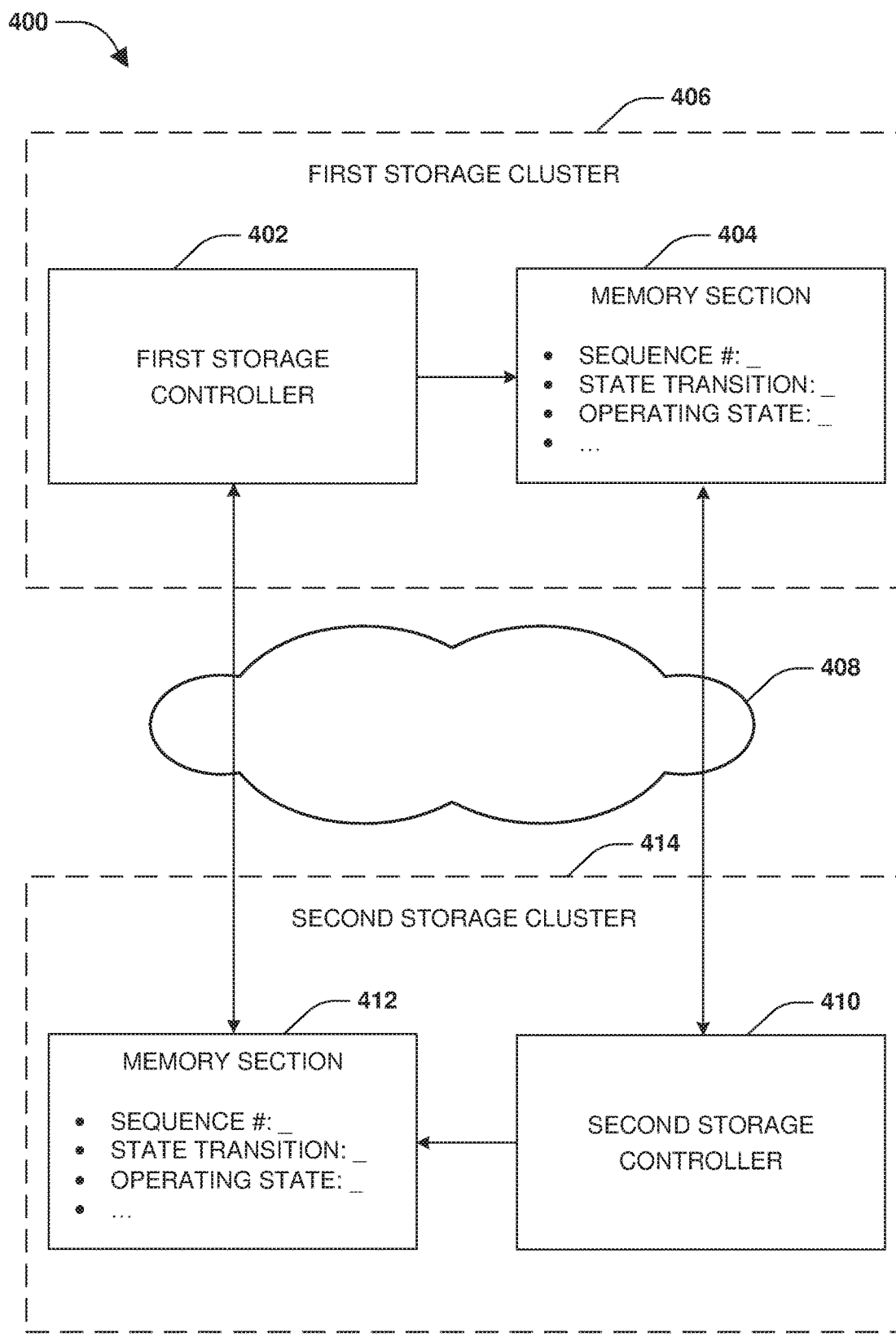
FIG. 4 is a component block diagram illustrating an exemplary computing device for implementing automatic switchover utilizing remote direct memory access (RDMA) read operations.

FIG. 4 illustrates an example of a system 400 for automatic switchover implementation. A first storage cluster 406 may comprise a first storage controller 402 and a second storage cluster 414 may comprise a second storage controller 410. The first storage controller 402 and the second storage controller 410 may be configured as disaster recovery partners. The first storage cluster 406 and the second storage cluster 414 may be connected by a network 408. The first storage controller 402 may store heartbeat status information, such as a series of sequence numbers indicative of progress of the first storage controller 402, state transition information, operating state information, etc., within a first memory section 404. The second storage controller 410 may perform remote direct memory access (RDMA) read operations to the first memory section 404 to obtain current heartbeat status information of the first storage controller 402. Responsive to the current heartbeat status information indicating a failure of the first storage controller 402, the second storage controller 410 may automatically implement a switchover operation to takeover processing client I/O requests previously processed by the first storage controller 402 before the failure.

The second storage controller 410 may store heartbeat status information, such as a series of sequence numbers indicative of progress of the second storage controller 410, state transition information, operating state information, etc., within a second memory section 412. The first storage controller 402 may perform remote direct memory access (RDMA) read operations to the second memory section 412 to obtain current heartbeat status information of the second storage controller 410. Responsive to the current heartbeat status information indicating a failure of the second storage controller 410, the first storage controller 402 may automatically implement a switchover operation to takeover processing client I/O requests previously processed by the second storage controller 410 before the failure.

Figure 5:
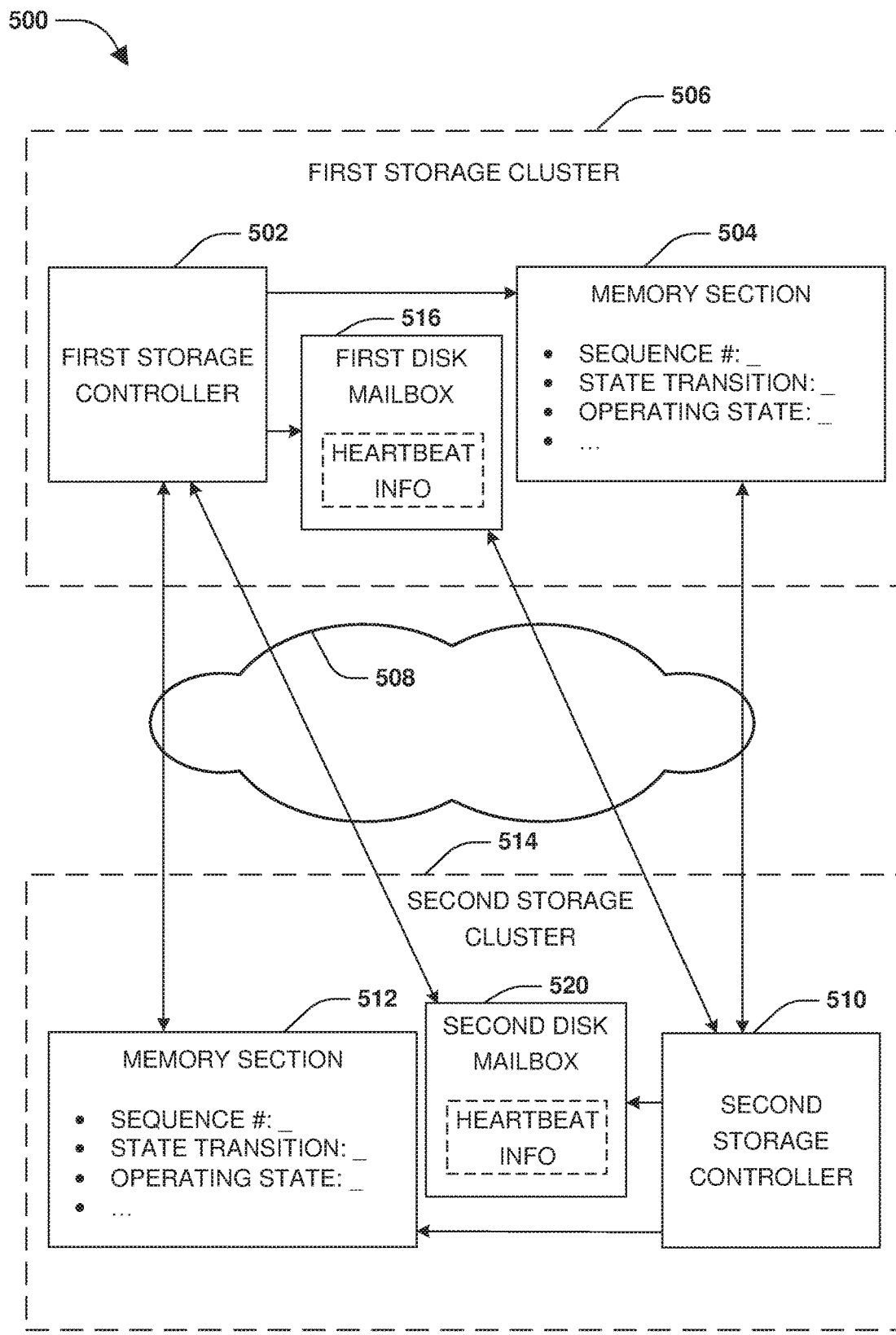
FIG. 5 is a component block diagram illustrating an exemplary computing device for implementing automatic switchover utilizing remote direct memory access (RDMA) read operations and disk mailboxes.

FIG. 5 illustrates an example of a system 500 for automatic switchover implementation. A first storage cluster 506 may comprise a first storage controller 502 and a second storage cluster 514 may comprise a second storage controller 510. The first storage controller 502 and the second storage controller 510 may be configured as disaster recovery partners. The first storage cluster 506 and the second storage cluster 514 may be connected by a network 508.

In an example of conveying heartbeat status information to the second storage controller 510, the first storage controller 502 may store heartbeat status information, such as a series of sequence numbers indicative of progress of the first storage controller 502, state transition information, operating state information, etc., within a first memory section 504. The second storage controller 510 may perform remote direct memory access (RDMA) read operations to the first memory section 504 to obtain current heartbeat status information of the first storage controller 502. In another example of conveying heartbeat status information to the second storage controller 510, the first storage controller 502 may store second heartbeat status information within a first disk mailbox 516 (e.g., a storage device owned by the first storage controller 502 and accessible through raw read operations by the second storage controller that is a non-owner of the storage device). The second storage controller 510 may perform a raw read operation to the first disk mailbox 516 to obtain second current heartbeat status information of the first storage controller 502. In this way, both the first memory section 504 and the first disk mailbox 516 are used to convey health information of the first storage controller 502. Responsive to the current heartbeat status information and/or the second current heartbeat status information indicating a failure of the first storage controller 502, the second storage controller 510 may automatically implement a switchover operation to takeover processing client I/O requests previously processed by the first storage controller 502 before the failure.

In an example of conveying heartbeat status information to the first storage controller 502, the second storage controller 510 may store heartbeat status information, such as a series of sequence numbers indicative of progress of the second storage controller 510, state transition information, operating state information, etc., within a second memory section 512. The first storage controller 502 may perform remote direct memory access (RDMA) read operations to the second memory section 512 to obtain current heartbeat status information of the second storage controller 510. In another example of conveying heartbeat status information to the first storage controller 502, the second storage controller 510 may store second heartbeat status information within a second disk mailbox 520. The first storage controller 502 may perform a raw read operation to the second disk mailbox 520 to obtain second current heartbeat status information of the second storage controller 510. In this way, both the second memory section 512 and the second disk mailbox 520 are used to convey health information of the second storage controller 510. Responsive to the current heartbeat status information and/or the second current heartbeat status information indicating a failure of the second storage controller 510, the first storage controller 502 may automatically implement a switchover operation to takeover processing client I/O requests previously processed by the second storage controller 510 before the failure.

Figure 6:
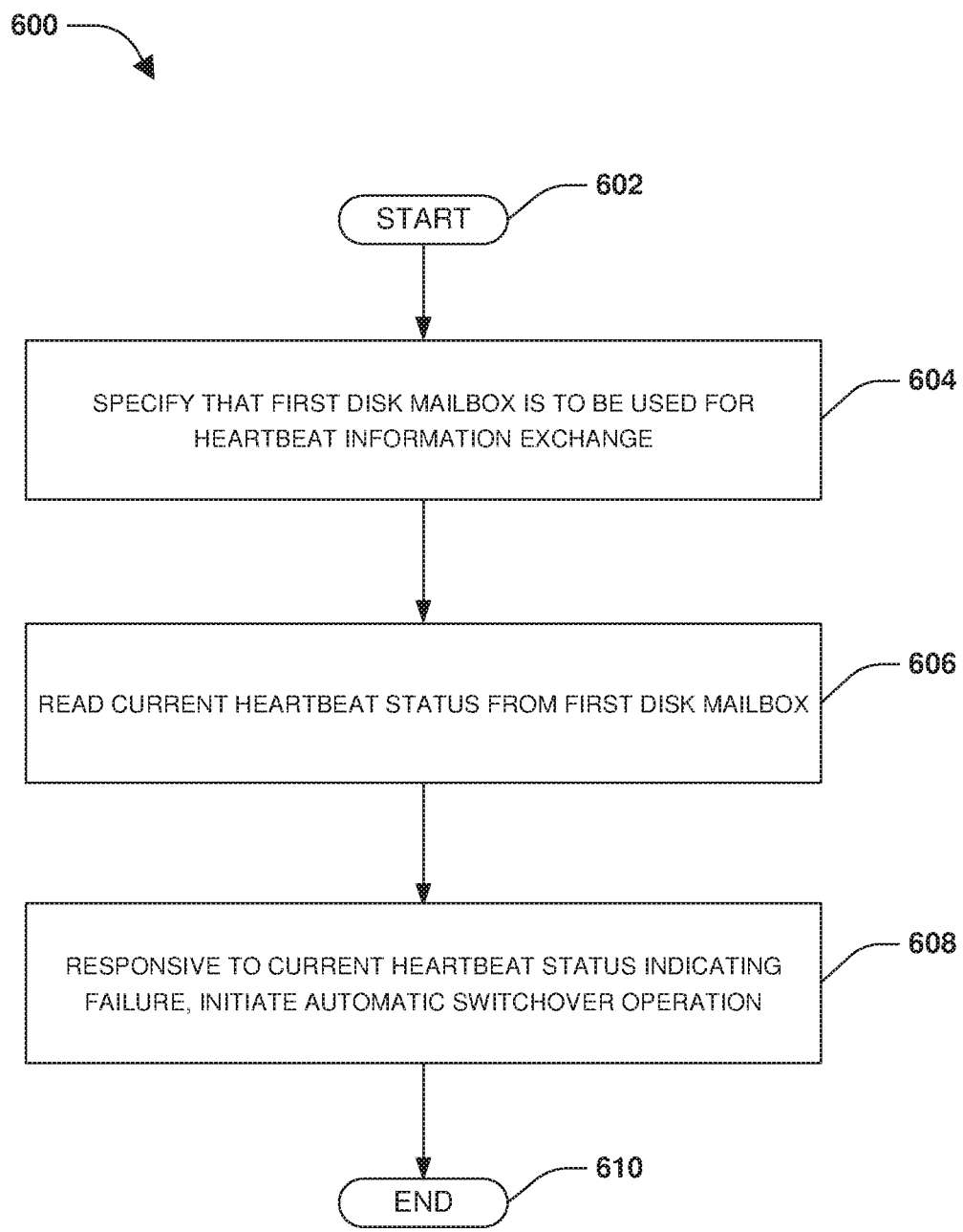
FIG. 6 is a flow chart illustrating an exemplary method of implementing automatic switchover.

One embodiment of automatic switchover implementation is illustrated by an exemplary method 600 of FIG. 6. A first storage cluster may comprise a first storage controller configured to provide clients with primary access to data stored within one or more storage devices. In an example, the first storage cluster has a single controller cluster configuration such that the first storage cluster merely comprises the first storage controller and no local high availability partner controller. A second storage cluster may comprise a second storage controller configured as a disaster recovery partner for the first storage controller. For example, upon detecting a failure of the first storage controller, the second storage controller may perform a switchover operation to obtain ownership of storage devices, owned by the first storage controller, so that the second storage controller may provide clients with failover access to such storage devices now owned by the second storage controller based upon the switchover operation. In an example, the second storage cluster has the single controller cluster configuration such that the second storage cluster merely comprises the second storage controller and no local high availability partner controller. As provided herein, a surviving storage controller may efficiently detect, cross-cluster, failure of a remote storage controller so that automatic switchover may be performed in a manner that satisfies client non-disruptive operation metrics.

At 602, the method 600 starts. At 604, a first disk mailbox may be specified for the use of heartbeat information exchange from the first storage controller to the second storage controller. For example, the first storage controller may store a series of sequences numbers indicative of progress by the first storage controller, a state transition (e.g., a transition into a software panic, a storage controller halt, a storage controller reboot, etc.), an indication of a normal operating state, etc. within the first disk mailbox. The first disk mailbox may be owned by the first storage controller and not the second storage controller. Even though the second storage controller does not own the first disk mailbox, the second storage controller may perform a read operation (e.g., a raw read operation) to obtain a current heartbeat status from the first disk mailbox, at 606.

At 608, responsive to the current heartbeat status indicating a failure of the first storage controller, an automatic switchover operation may be performed. For example, the second storage controller may automatically trigger the switchover operation to obtain ownership of storage devices owned by the first storage controller. In this way, the second storage controller may provide clients with failover access to the storage devices so that clients are provided with non-disruptive access to data.

In an example, one or more checks may be performed before triggering the automatic switchover operation. For example, a communication signal may be sent from the second storage controller to the first storage cluster. Responsiveness to the communication signal may be evaluated to determine whether the failure is a false trigger (e.g., the first storage cluster may respond with an indication that the first storage controller is in an operational state). If the failure is a false trigger, then the automatic switchover may not be performed. If the failure is not a false trigger, then the automatic switchover operation may be performed and/or other checks may be performed. For example, responsive to determining that the failure is not the false trigger, a determination may be made as to whether storage and/or a main controller (e.g., a main box) of the first storage cluster are available. Responsive to the storage and/or the main controller not being available, a manual switchover operation may be performed instead of the automatic switchover operation. Responsive to the storage and/or the main controller being available, the automatic switchover operation may be performed and/or other checks may be performed. For example, a write caching synchronization state between the first storage controller and the second storage controller may be evaluated. The write caching synchronization state may be read from the first disk mailbox of the first storage controller (e.g., a raw read may be performed upon a storage device, owned by the first storage controller but not the second storage controller, hosting the first disk mailbox). Responsive to the write caching synchronization state indicating a synchronous state between a first write cache of the first storage controller and a second write cache of the second storage controller, the automatic switchover may be performed. Responsive to the write caching synchronization state indicating a non-synchronous state, the automatic switchover may not be performed.

In an example, heartbeat status information may also be obtained from a memory section of the first storage controller. For example, the second storage controller may perform a remote direct memory access (RDMA) read operation to the memory section to obtain a second current heartbeat status of the first storage controller. Responsive to the current heartbeat status and/or the second current heartbeat status indicating the failure, the automatic switchover operation may be implemented. At 610, the method 600 ends.

Figure 7:
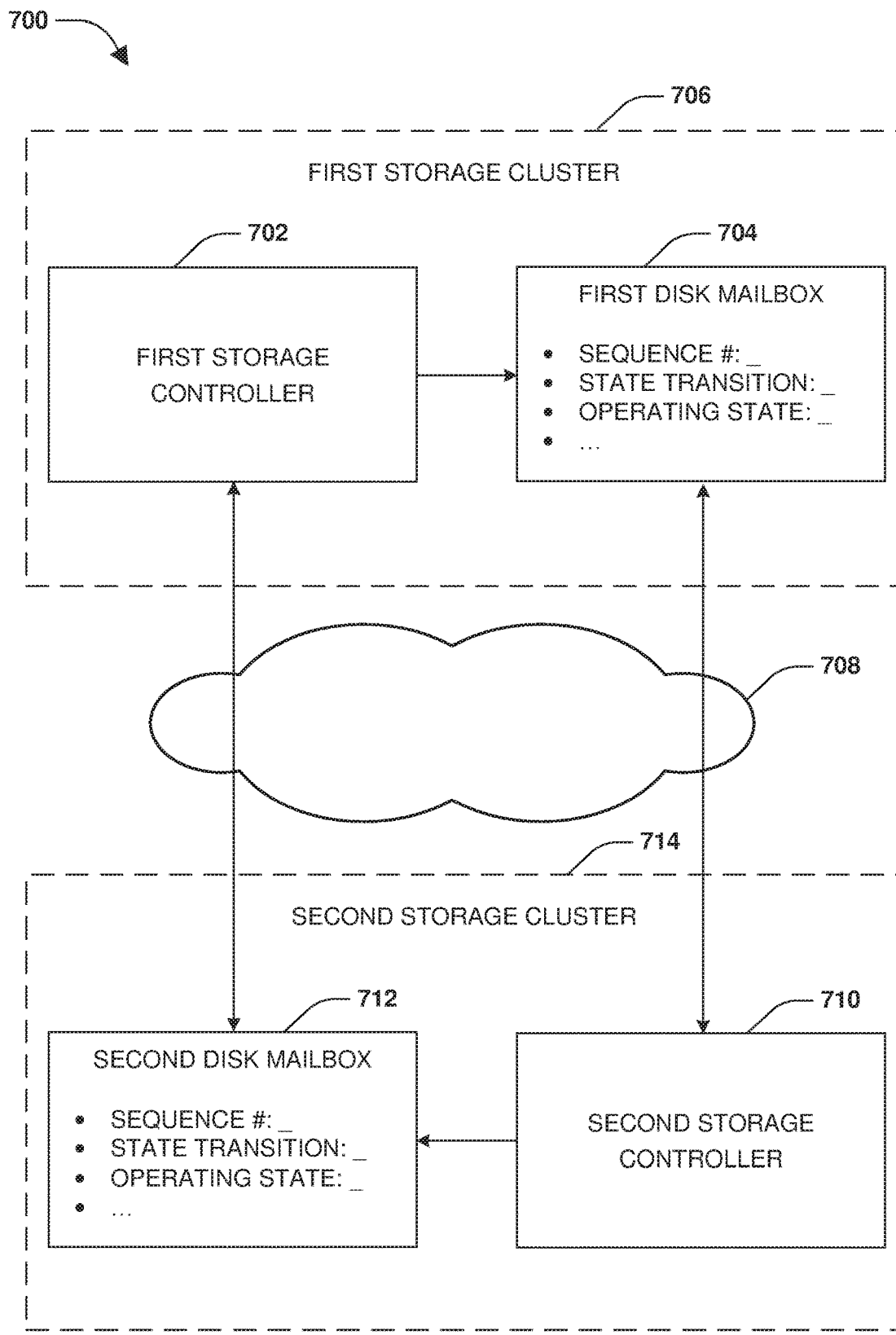
FIG. 7 is a component block diagram illustrating an exemplary computing device for implementing automatic switchover utilizing disk mailboxes.

FIG. 7 illustrates an example of a system 700 for automatic switchover operation implementation. A first storage cluster 706 may comprise a first storage controller 702 and a second storage cluster 714 may comprise a second storage controller 710. The first storage controller 702 and the second storage controller 710 may be configured as disaster recovery partners. The first storage cluster 706 and the second storage cluster 714 may be connected by a network 708.

The first storage controller 702 may store heartbeat status information, such as a series of sequence numbers indicative of progress of the first storage controller 702, state transition information, operating state information, etc., within a first disk mailbox 704 (e.g., a storage device owned by the first storage controller 702 and accessible through raw read operations by the second storage controller that is a non-owner of the storage device). The second storage controller 710 may perform a raw read operation to the first disk mailbox to obtain current heartbeat status information of the first storage controller 702. Responsive to the current heartbeat status information indicating a failure of the first storage controller 702, the second storage controller 710 may automatically implement a switchover operation to takeover processing client I/O requests previously processed by the first storage controller 702 before the failure.

The second storage controller 710 may store heartbeat status information, such as a series of sequence numbers indicative of progress of the second storage controller 710, state transition information, operating state information, etc., within a second disk mailbox 712. The first storage controller 702 may perform a raw read operation to the second disk mailbox 712 to obtain current heartbeat status information of the second storage controller 710. Responsive to the current heartbeat status information indicating a failure of the second storage controller 710, the first storage controller 702 may automatically implement a switchover operation to takeover processing client I/O requests previously processed by the second storage controller 710 before the failure.

Figure 8:
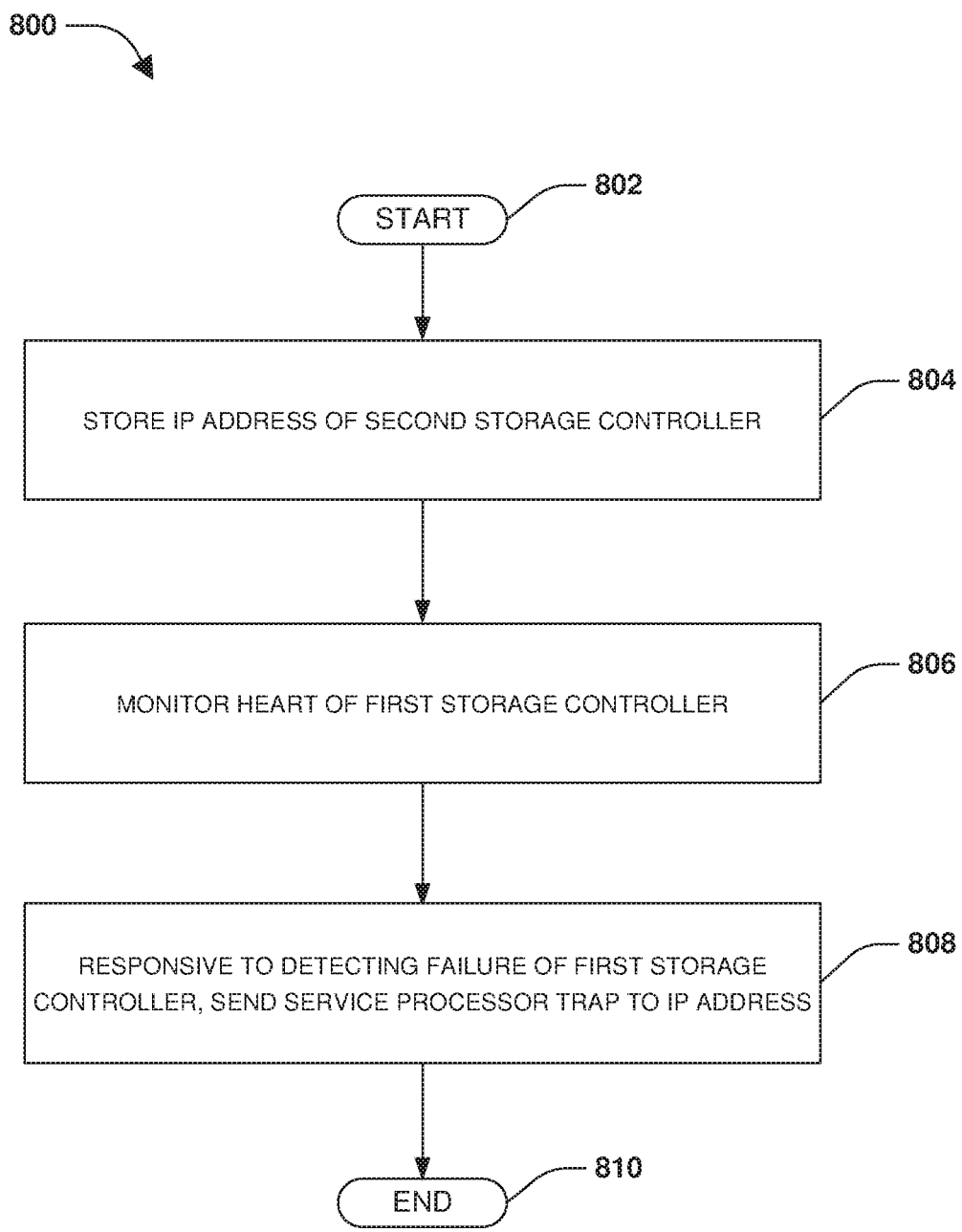
FIG. 8 is a flow chart illustrating an exemplary method of implementing automatic switchover.

One embodiment of automatic switchover implementation is illustrated by an exemplary method 800 of FIG. 8. A first storage cluster may comprise a first storage controller configured to provide clients with primary access to data stored within one or more storage devices. In an example, the first storage cluster has a single controller cluster configuration such that the first storage cluster merely comprises the first storage controller and no local high availability controller partner. The first storage controller may comprise a first storage processor (e.g., a microcontroller comprising an operating system, functionality used to monitor health of the first storage controller, and/or a battery for power in the event the first storage controller loses power). A second storage cluster may comprise a second storage controller configured as a disaster recovery partner for the first storage controller. For example, upon detecting a failure of the first storage controller, the second storage controller may perform a switchover operation to obtain ownership of storage devices, owned by the first storage controller, so that the second storage controller may provide clients with failover access to such storage devices now owned by the second storage controller based upon the switchover operation. In an example, the second storage cluster has the single controller cluster configuration such that the second storage cluster merely comprises the second storage controller and no local high availability controller partner. The second storage controller may comprise a second storage processor (e.g., a microcontroller comprising an operating system, functionality used to monitor health of the second storage controller, and/or a battery for power in the event the second storage controller loses power). As provided herein, a surviving storage controller may efficiently detect, cross-cluster, failure of a remote storage controller so that automatic switchover may be performed in a manner that satisfies client non-disruptive operation metrics.

At 802, the method 800 starts. At 804, an internet protocol (IP) address and/or other communication information (e.g., a port number, authentication information such as a shared secret, etc.) of the second storage controller (e.g., and/or the second service processor) may be stored by the first storage controller, such as into a location accessible to the first service processor. At 806, the first storage processor may monitor health of the first storage controller. At 808, responsive to detecting a failure of the first storage controller (e.g., a power loss, which may not affect the first storage processor because the first storage processor may have a battery for reserve power), a service processor trap may be sent by the first service processor to the IP address and/or the port number. In an example, the service processor trap may include the authentication information for authentication by the second storage controller. The service processor trap may trigger the second storage controller to initiate an automatic switchover operation from the first storage controller to the second storage controller for providing clients with failover access to data previously accessible to the clients through the first storage controller before the switchover. At 810, the method 800 ends.

Figure 9:
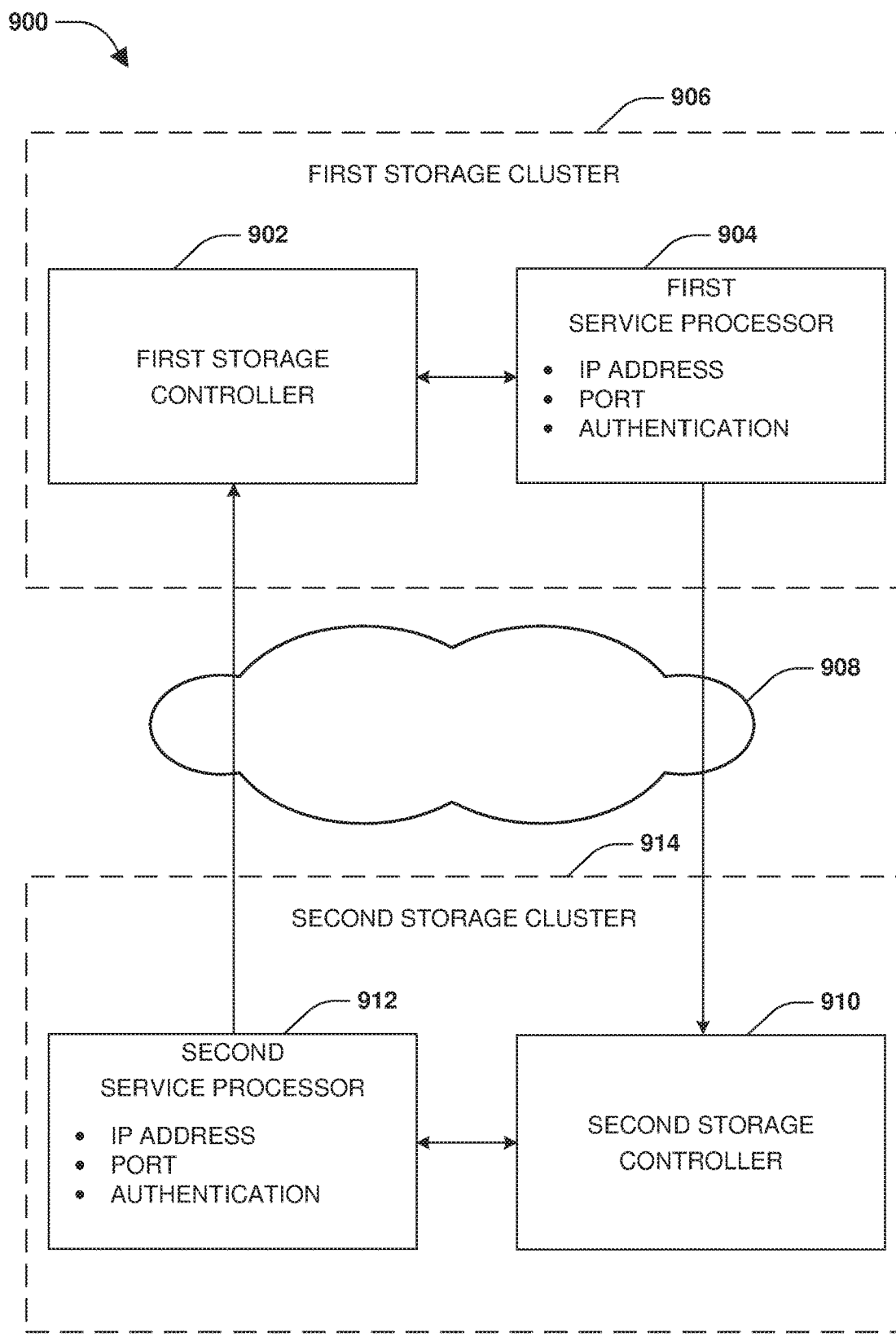
FIG. 9 is a component block diagram illustrating an exemplary computing device for implementing automatic switchover utilizing service processor traps.

FIG. 9 illustrates an example of a system 900 for automatic switchover implementation. A first storage cluster 906 may comprise a first storage controller 902 and a second storage cluster 914 may comprise a second storage controller 910. The first storage controller 902 and the second storage controller 910 may be configured as disaster recovery partners. The first storage cluster 906 and the second storage cluster 914 may be connected by a network 908.

The first storage controller 902 may comprise a first service processor 904 configured to monitor health of the first storage controller 902 so that the first service processor 904 may alert the second storage controller 910 and/or the second service processor 912 of a failure of the first storage controller 902. For example, the first service processor 904 may store an IP address, a port number, and/or authentication information used to communicate with the second storage controller 910 and/or the second service processor 912. Responsive to the first service processor 904 detecting a failure of the first storage controller 902, such as a power loss, the first service processor 904 may send a service processor trap to the second storage controller 910 and/or the second service processor 912 using the IP address, the port number, and/or the authentication information. The service processor trap may trigger the second storage controller 910 to initiate an automatic switchover operation from the first storage controller 902 to the second storage controller 910 for providing clients with failover access to data previously accessible to the clients through the first storage controller 902 before switchover.

The second storage controller 910 may comprise a second service processor 912 configured to monitor health of the second storage controller 910 so that the second service processor 912 may alert the first storage controller 902 and/or the first service processor 904 of a failure of the second storage controller 910. For example, the second service processor 912 may store an IP address, a port number, and/or authentication information used to communicate with the first storage controller 902 and/or the first service processor 904. Responsive to the second service processor 912 detecting a failure of the second storage controller 910, such as a power loss, the second service processor 912 may send a service processor trap to the first storage controller 902 and/or the first service processor 904 using the IP address, the port number, and/or the authentication information. The service processor trap may trigger the first storage controller 902 to initiate an automatic switchover operation from the second storage controller 910 to the first storage controller 902 for providing clients with failover access to data previously accessible to the clients through the second storage controller 910 before switchover.

Figure 10:
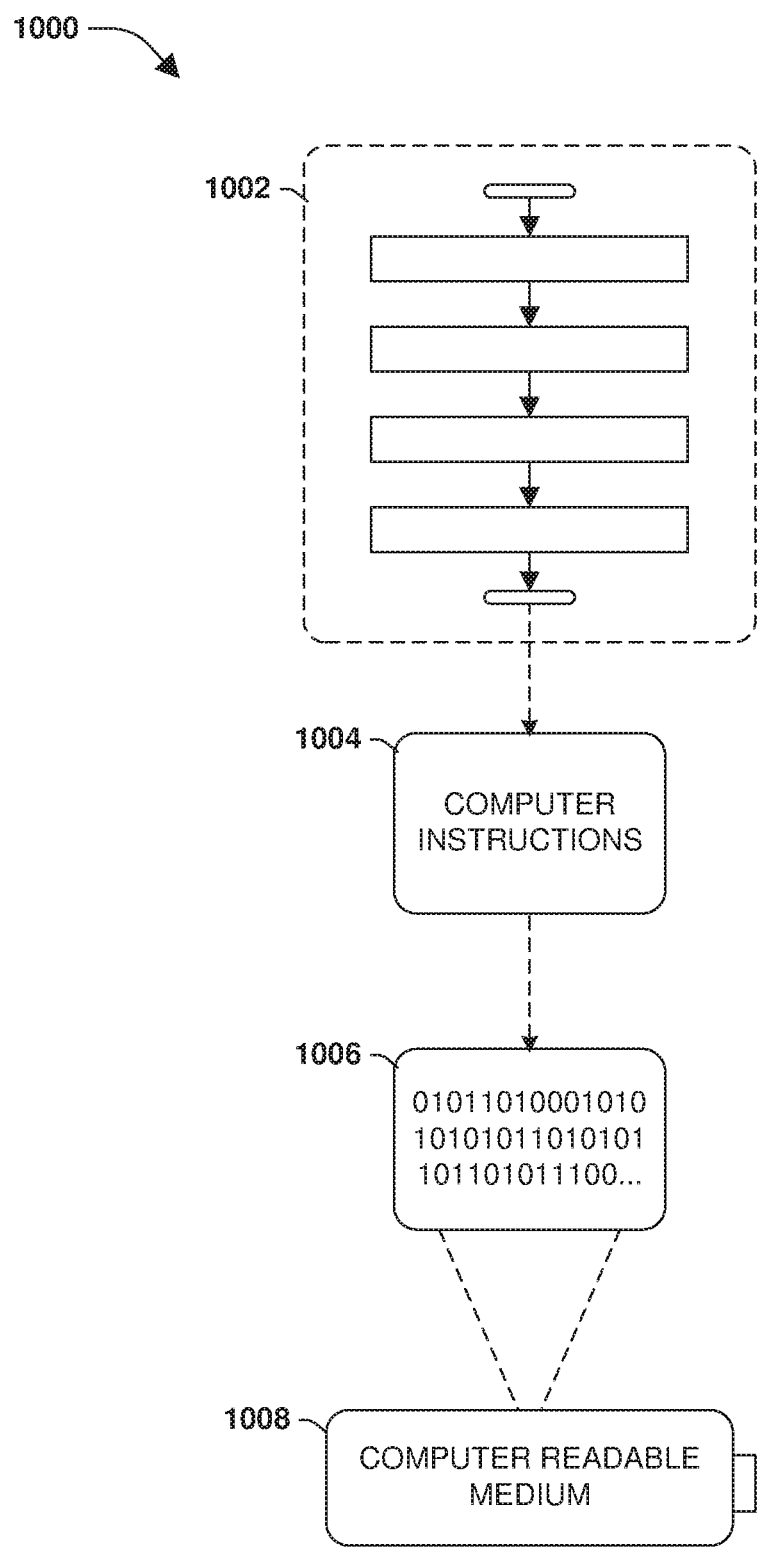
FIG. 10 is an example of a computer readable medium in accordance with one or more of the provisions set forth herein.

Still another embodiment involves a computer-readable medium comprising processor-executable instructions configured to implement one or more of the techniques presented herein. An example embodiment of a computer-readable medium or a computer-readable device that is devised in these ways is illustrated in FIG. 10, wherein the implementation 1000 comprises a computer-readable medium 1008, such as a CD-R, DVD-R, flash drive, a platter of a hard disk drive, etc., on which is encoded computer-readable data 1006. This computer-readable data 1006, such as binary data comprising at least one of a zero or a one, in turn comprises a set of computer instructions 1004 configured to operate according to one or more of the principles set forth herein. In some embodiments, the processor-executable computer instructions 1004 are configured to perform a method 1002, such as at least some of the exemplary method 300 of FIG. 3, at least some of the exemplary method 600 of FIG. 6, and/or at least some of the exemplary method 800 of FIG. 8, for example. In some embodiments, the processor-executable instructions 1004 are configured to implement a system, such as at least some of the exemplary system 400 of FIG. 4, at least some of the exemplary system 500 of FIG. 5, at least some of the exemplary system 700 of FIG. 7, and/or at least some of the exemplary system 900 of FIG. 9, for example. Many such computer-readable media are contemplated to operate in accordance with the techniques presented herein.

It will be appreciated that processes, architectures and/or procedures described herein can be implemented in hardware, firmware and/or software. It will also be appreciated that the provisions set forth herein may apply to any type of special-purpose computer (e.g., file host, storage server and/or storage serving appliance) and/or general-purpose computer, including a standalone computer or portion thereof, embodied as or including a storage system. Moreover, the teachings herein can be configured to a variety of storage system architectures including, but not limited to, a network-attached storage environment and/or a storage area network and disk assembly directly attached to a client or host computer. Storage system should therefore be taken broadly to include such arrangements in addition to any subsystems configured to perform a storage function and associated with other equipment or systems.

In some embodiments, methods described and/or illustrated in this disclosure may be realized in whole or in part on computer-readable media. Computer readable media can include processor-executable instructions configured to implement one or more of the methods presented herein, and may include any mechanism for storing this data that can be thereafter read by a computer system. Examples of computer readable media include (hard) drives (e.g., accessible via network attached storage (NAS)), Storage Area Networks (SAN), volatile and non-volatile memory, such as read-only memory (ROM), random-access memory (RAM), EEPROM and/or flash memory, CD-ROMs, CD-Rs, CD-RWs, DVDs, cassettes, magnetic tape, magnetic disk storage, optical or non-optical data storage devices and/or any other medium which can be used to store data.

Although the subject matter has been described in language specific to structural features or methodological acts, it is to be understood that the subject matter defined in the appended claims is not necessarily limited to the specific features or acts described above. Rather, the specific features and acts described above are disclosed as example forms of implementing at least some of the claims.

Various operations of embodiments are provided herein. The order in which some or all of the operations are described should not be construed to imply that these operations are necessarily order dependent. Alternative ordering will be appreciated given the benefit of this description. Further, it will be understood that not all operations are necessarily present in each embodiment provided herein. Also, it will be understood that not all operations are necessary in some embodiments.

Furthermore, the claimed subject matter is implemented as a method, apparatus, or article of manufacture using standard application or engineering techniques to produce software, firmware, hardware, or any combination thereof to control a computer to implement the disclosed subject matter. The term "article of manufacture" as used herein is intended to encompass a computer application accessible from any computer-readable device, carrier, or media. Of course, many modifications may be made to this configuration without departing from the scope or spirit of the claimed subject matter.

As used in this application, the terms "component", "module," "system", "interface", and the like are generally intended to refer to a computer-related entity, either hardware, a combination of hardware and software, software, or software in execution. For example, a component includes a process running on a processor, a processor, an object, an executable, a thread of execution, an application, or a computer. By way of illustration, both an application running on a controller and the controller can be a component. One or more components residing within a process or thread of execution and a component may be localized on one computer or distributed between two or more computers.

Moreover, "exemplary" is used herein to mean serving as an example, instance, illustration, etc., and not necessarily as advantageous. As used in this application, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B and/or both A and B. Furthermore, to the extent that "includes", "having", "has", "with", or variants thereof are used, such terms are intended to be inclusive in a manner similar to the term "comprising".

Many modifications may be made to the instant disclosure without departing from the scope or spirit of the claimed subject matter. Unless specified otherwise, "first," "second," or the like are not intended to imply a temporal aspect, a spatial aspect, an ordering, etc. Rather, such terms are merely used as identifiers, names, etc. for features, elements, items, etc. For example, a first set of information and a second set of information generally correspond to set of information A and set of information B or two different or two identical sets of information or the same set of information.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A method comprising:
    determining that a disk mailbox and a memory storage section are designated for heartbeat information exchange from a first node to a second node;
    reading a first current heartbeat status of the first node from the disk mailbox;
    performing a remote direct memory access read operation to read a second current heartbeat status of the first node from the memory storage section;
    determining a write caching synchronization state between the first node and the second node based upon a combination of the first and second current heartbeat statuses indicating a failure of the first node; and
    refraining from initiating an automatic switchover operation based upon the write caching synchronization state indicating a non-synchronous state.

2. The method of claim 1, comprising:
    refraining from initiating the automatic switch over operation if the first current heartbeat status indicates that the first node is operational and the second current heartbeat status indicates that the first node has failed.

3. The method of claim 1, comprising:
    reading the write caching synchronization state from the disk mailbox of the first node.

4. The method of claim 1, comprising:
    refraining from initiating the automatic switch over operation if the second current heartbeat status indicates that the first node is operational and the first current heartbeat status indicates that the first node has failed.

5. The method of claim 1, wherein the first current heartbeat status specifies a storage controller reboot as the failure.

6. The method of claim 1, wherein the first current heartbeat status specifies a state transition of the first node.

7. The method of claim 1, wherein the heartbeat information exchange corresponds to a series of sequence numbers used to indicate progress of the first node.

8. The method of claim 1, comprising:
    evaluating responsiveness to a communication signal sent from the second node to the first node to determine whether the failure is a false trigger.

9. The method of claim 1, comprising:
initiating a manual switchover operation based upon a determination that storage and a main controller of a cluster comprising the first node are unavailable.

10. The method of claim 1, wherein the first node is configured according to a single controller cluster configuration and the second node is configured according to the single controller cluster configuration.

11. The method of claim 10, comprising:
determining the failure as a power loss failure based upon both the first current heartbeat status and the second current heartbeat status indicating the failure.

12. The method of claim 11, comprising:
initiating the automatic switchover operation after a threshold timeout based upon both the first current heartbeat status and the second current heartbeat status indicating the failure.

13. A non-transitory machine readable medium comprising machine executable code which when executed by a machine, causes the machine to:
determine that a storage section is designated for heartbeat information exchange from a first node to a second node;
perform a read operation to access the storage section for obtaining a current heartbeat status of the first node;
determine a write caching synchronization state between the first node and the second node based upon the current heartbeat status indicating a failure of the first node;
refrain from initiating an automatic switchover operation based upon the write caching synchronization state indicating that the second node has not accounted for client I/O operations temporarily stored by the first node within a write cache before being written to a storage device by the first node; and
in response to the write caching synchronization state indicating that the second node has accounted for the client I/O operations and is in a synchronous state, initiating the automatic switchover.

14. The non-transitory machine readable medium of claim 13, wherein the storage section comprises a memory section accessible by a remote direct memory access read operation.

15. The non-transitory machine readable medium of claim 13, wherein the machine executable code causes the machine to:
reading the write caching synchronization state from a disk mailbox of the first node.

16. The non-transitory machine readable medium of claim 13, wherein the storage section comprises a disk mailbox and the current heartbeat status is read from the disk mailbox.

17. The non-transitory machine readable medium of claim 13, wherein the current heartbeat status specifies a storage controller reboot as the failure.

18. The non-transitory machine readable medium of claim 13, wherein the current heartbeat status specifies a state transition of the first node.

19. A computing device comprising:
a memory comprising machine executable code; and
a service processor coupled to the memory, the service processor configured to execute the machine executable code to cause the service processor to:
store an internet protocol (IP) address of a second storage controller that is within a second storage cluster, the second storage controller configured as a disaster recovery partner for a first storage controller that is within a first storage cluster;
monitor health of the first storage controller;
detect a failure of the first storage controller;
generate a service processor trap based upon the IP address, a port number of the second controller, and a shared secret within authentication information for the second storage controller; and
send the service processor trap to the IP address, the service processor trap triggering the second storage controller to initiate an automatic switchover operation from the first storage controller to the second storage controller for providing clients with failover access to data previously accessible to the clients through the first storage controller before switchover.

20. The computing device of claim 19, wherein the service processor comprises a battery used to power the service processor in the event the first storage controller loses power.

* * * * *